(12) United States Patent
Sabella

(10) Patent No.: US 7,547,983 B2
(45) Date of Patent: Jun. 16, 2009

(54) METHOD AND SYSTEM FOR GENERATING ELECTRICITY THROUGH THE USE OF A MOVING VEHICLE

(76) Inventor: Paul Sabella, 6452 River Run, Columbia, MD (US) 21044

( * ) Notice: Subject to any disclaimer, the term of this patent is extended or adjusted under 35 U.S.C. 154(b) by 0 days.

(21) Appl. No.: 12/149,471

(22) Filed: May 2, 2008

(65) Prior Publication Data

US 2008/0284169 A1  Nov. 20, 2008

Related U.S. Application Data

(60) Provisional application No. 60/924,172, filed on May 2, 2007.

(51) Int. Cl.
*F02D 29/06* (2006.01)
(52) U.S. Cl. ............... 290/40 C; 290/40 A; 290/40 D; 60/710; 60/706
(58) Field of Classification Search ............ 290/40 C, 290/40 A, 40 D; 60/710, 706
See application file for complete search history.

(56) References Cited

U.S. PATENT DOCUMENTS

| 2,941,613 | A | 6/1960 | Di Perna |
| 3,374,849 | A | 3/1968 | Redman |
| 3,444,946 | A | 5/1969 | Waterbury |
| 3,621,930 | A | 11/1971 | Dutchak |
| 3,942,025 | A | 3/1976 | Ri |
| 4,019,828 | A | 4/1977 | Bunzer |
| 4,254,843 | A | 3/1981 | Han et al. |
| 6,138,781 | A | 10/2000 | Hakala |
| 7,285,869 | B2* | 10/2007 | Syed et al. ............ 290/40 C |
| 7,336,000 | B2* | 2/2008 | Stahlhut et al. ........... 290/52 |
| 7,446,426 | B2* | 11/2008 | Sheidler et al. ......... 290/40 A |
| 7,468,562 | B1* | 12/2008 | Barbic .................. 290/40 C |

\* cited by examiner

*Primary Examiner*—Nicholas Ponomarenko
*Assistant Examiner*—Iraj A Mohandesi
(74) *Attorney, Agent, or Firm*—Hoffman Wasson & Gitler

(57) ABSTRACT

A method and system of producing electrical energy by a moving vehicle. Moving air would be introduced to the vehicle provided with a generator for producing electricity. This electricity would be transmitted to one or more storage batteries connected between the generator and the vehicle's motor. Once sufficient energy is stored in the storage batteries, the vehicle would proceed to a facility for transferring the stored electricity in the storage batteries to batteries or other storage devices provided at the facility. The vehicle's owner would then receive remuneration or credit based upon the amount of energy transferred.

23 Claims, 4 Drawing Sheets

METHOD AND SYSTEM FOR GENERATING ELECTRICITY THROUGH THE USE OF A MOVING VEHICLE

CROSS-REFERENCE TO RELATED APPLICATIONS

The present invention is based upon U.S. provisional patent application Ser. No. 60/924,172, filed May 2, 2007.

FIELD OF THE INVENTION

The present invention is directed to a method and system for generating electricity through the use of a moving vehicle and transferring this electricity to a collection facility, or using the generated electricity to power any external load.

BACKGROUND OF THE INVENTION

Electricity is one of the most important forms of energy. It is used to produce both light and heat and it functions to power various devices from the most mundane electrical appliances to complex industrial machinery. Electric power also enables us to utilize telephones, computers, motion pictures, television, radio, and the like. In most instances, electricity is produced by converting mechanical energy to electrical energy. Historically, this was first accomplished through the use of movement of air, such as would power a windmill, as well as the movement of water used to power a simple turbine. Increasingly, however, electricity has been produced by the use of non-renewable fuels, such as coal, which is used to power large facilities for the production of electricity. Since these sources of power are limited in nature, and due to the ever growing thirst for electricity in this country, as well as in developing countries, such as India and China, a renewable source of powering the generators which produce almost all of the electricity used by people, must be developed.

A generator does not create electricity, but changes mechanical energy into electrical energy, as previously noted with respect to the use of moving water or wind power. All generators consist of a magnet and a loop of wire producing a magnetic field. When the loop of wire is rotated between the poles of the magnet, electricity is induced in the loop. Therefore, when a source of energy, such as wind is used to rotate the loop, electricity would flow in both directions through the loop during every single complete rotation of the loop through the magnet, thereby producing alternating voltage and alternating current. This particular generator is known as an alternating current generator. Direct current generators are produced by utilizing a commutator to force the current to move in only one direction. Once the electrical energy is produced, either by use of the alternating current generator or the direct current generator, the electricity can be stored in a battery for later use.

Virtually all motor vehicles are provided with one or more storage batteries. Generally, these storage batteries are used in the ignition of the vehicle and then are charged as the vehicle moves, by the use of a generator inducing electricity through the use of the movement of a shaft, such as a drive wheel or axle and not by the use of moving air.

However, several patents have been developed which utilize air flow produced by the movement of a vehicle to generate electricity. For example, U.S. Pat. No. 4,019,828, issued to Bunzer, describes a wind driven apparatus utilizing a fluid driven device affixed to the top roof of an automobile for generating electricity used to power the automobile.

U.S. Pat. No. 4,254,843, issued to Han et al., illustrates the use of whirl ventilator charging system used to supply electricity to a bank of batteries employed to power the vehicle.

Similarly, U.S. Pat. No. 2,941,613, issued to Di Perna; U.S. Pat. No. 3,374,849, issued to Redman; U.S. Pat. No. 3,621,930, issued to Dutchak; U.S. Pat. No. 3,444,946, issued to Waterbury; U.S. Pat. No. 3,942,025, issued to Ri, and U.S. Pat. No. 6,138,781, issued to Hakala, all describe various devices associated with an automotive vehicle for utilizing wind to produce energy to power the particular vehicle, but not for any other purpose.

SUMMARY OF THE INVENTION

The present invention addresses the deficiencies of the prior art by producing a system in which a motor vehicle employs the air flow associated with a moving vehicle to produce electrical energy. This electrical energy is stored in one or more storage batteries which can not only assist in the ignition of that motor vehicle, but can also be transferred to a facility allowing the collected electricity to be used to power other devices. These facilities would be provided with various devices for allowing the transference of the electricity produced by the motor vehicle to various large commercial storage batteries. The owner of the motor vehicle would receive either remuneration or credit for the amount of electricity transferred from their vehicle to the storage facility.

Alternatively, the electricity generated and stored by the motor vehicle can be used to directly power various loads, such as appliances, lamps and other devices from the generated electricity. In this embodiment, the operator of the vehicle would return home, his place of business or any other location and use some or all of the electricity at that location. Based upon the amount of electricity used or transferred to a utility, the operator would obtain a credit or remittance, or might directly be transferred to a credit, debit or a prepaid card system.

The present invention contemplates a system in which the transference of electricity from the vehicle to a collection facility or utility will be monitored by the collection facility, utilizing an independent third party. The monitoring agency would oversee the operation and transference of funds or credit between the parties.

BRIEF DESCRIPTION OF THE DRAWINGS

The foregoing aspects and other features of the invention are explained in the following description taken in connection with the accompanying drawings wherein.

DESCRIPTION OF THE PREFERRED EMBODIMENTS

Figure 1:
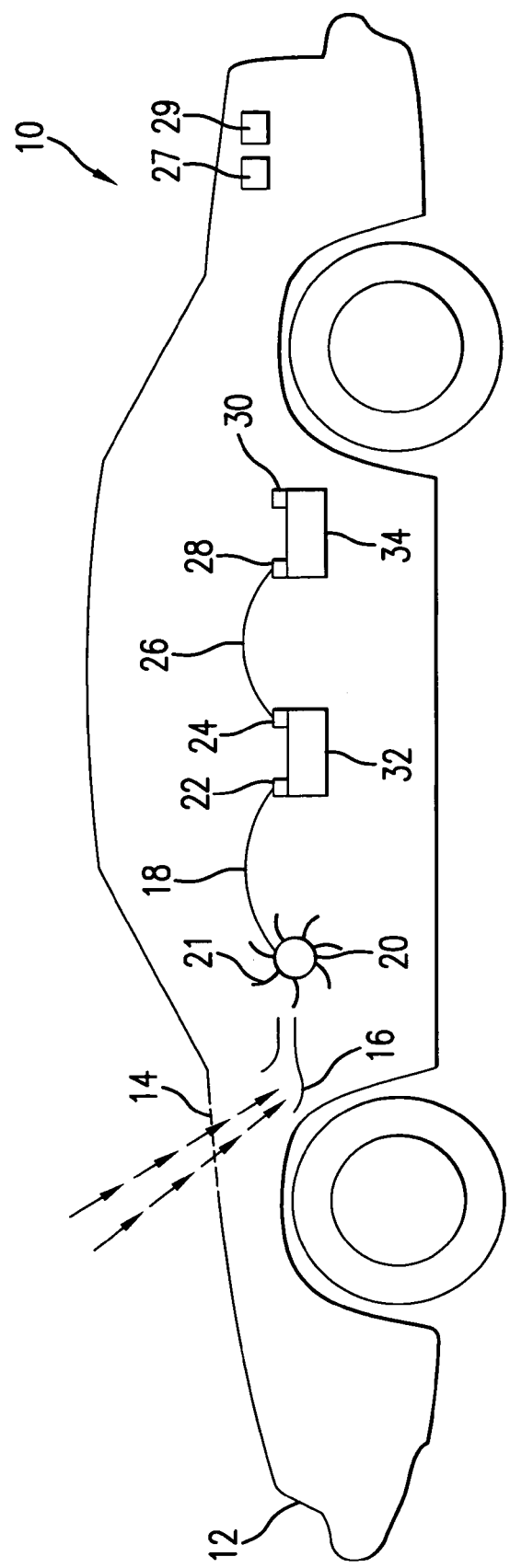
FIG. 1 is a side view of a vehicle utilizing the teachings of the present invention to produce electricity.

FIG. 1 illustrates the present invention 10 in which a motor vehicle 12 of any type or size is used to generate electricity as the vehicle is moving. Moving air flows through an air intake 14 preferably situated near the front of the vehicle 12, or alternatively on the roof of the vehicle. To increase the speed of the air, the air is introduced to a venturi 16, which would direct the moving air toward a generator 20 provided with a plurality of blades or propellers 21. The generator would produce either alternating or direct current through the use of the rotating blades or propellers. However, for the purposes of the present invention, it will be assumed that direct current is produced. The electricity would then be transmitted through the use of a wire or cable 18 to a plurality of batteries 32 and 34. Although two batteries are shown, it is contemplated that any number of storage batteries may be utilized. It is also noted that these batteries are used to both store the electricity produced by the generator 20 as well as used in the ignition system of the present invention. Each of the batteries is provided with positive and negative terminals 22, 24, 28 and 30. It is also noted that a wire or cable 26 is provided between the two batteries 32 and 34. Alternatively, one battery may be designated to be used in the ignition system, whereas the remaining battery or batteries would only be used to store electricity.

Once the vehicle 12 starts and begins to move, a switch, as will be further explained, will complete a circuit, including the generator 20 and the batteries 32 and 34 to store electricity therein as the vehicle moves.

Figure 2:
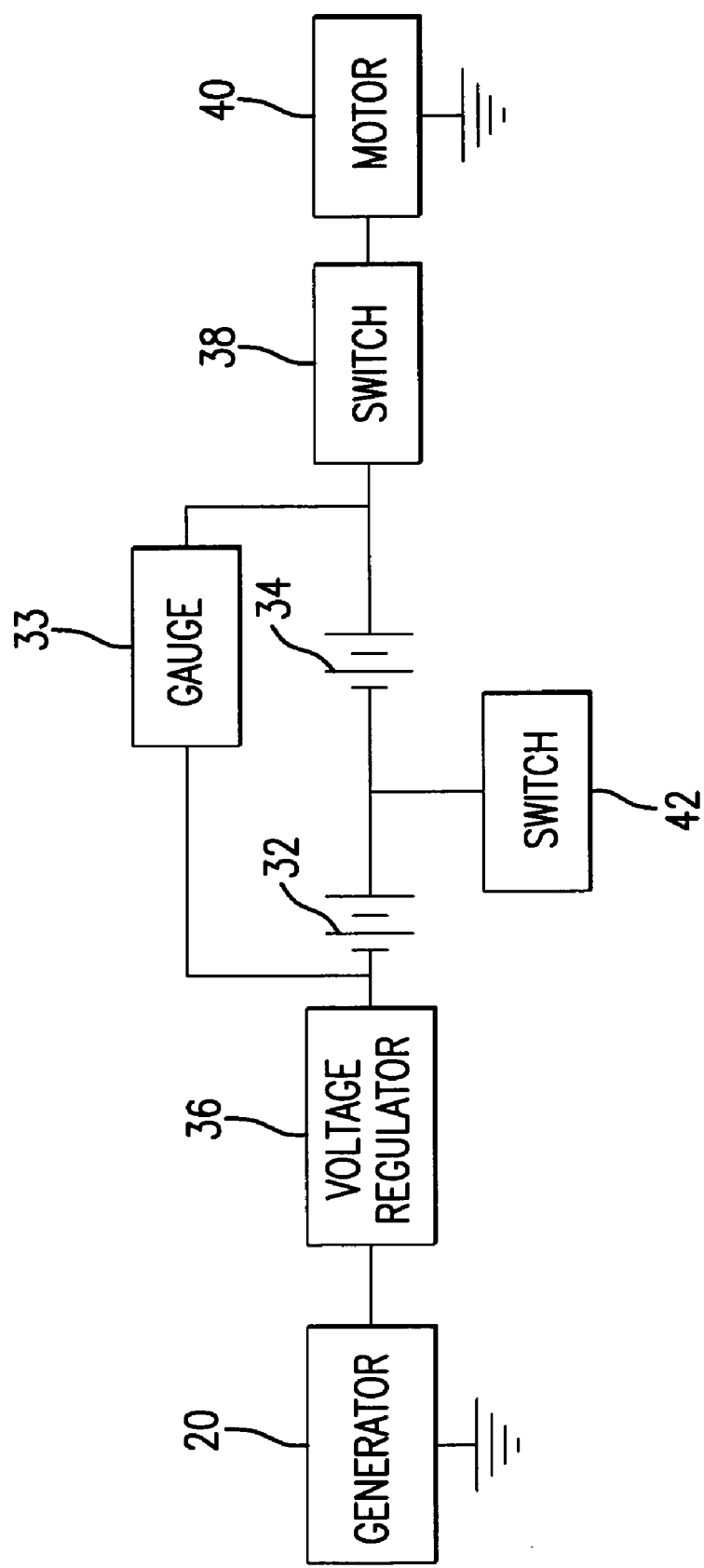
FIG. 2 is an electrical diagram showing the teachings of the present invention.
Figure 3:
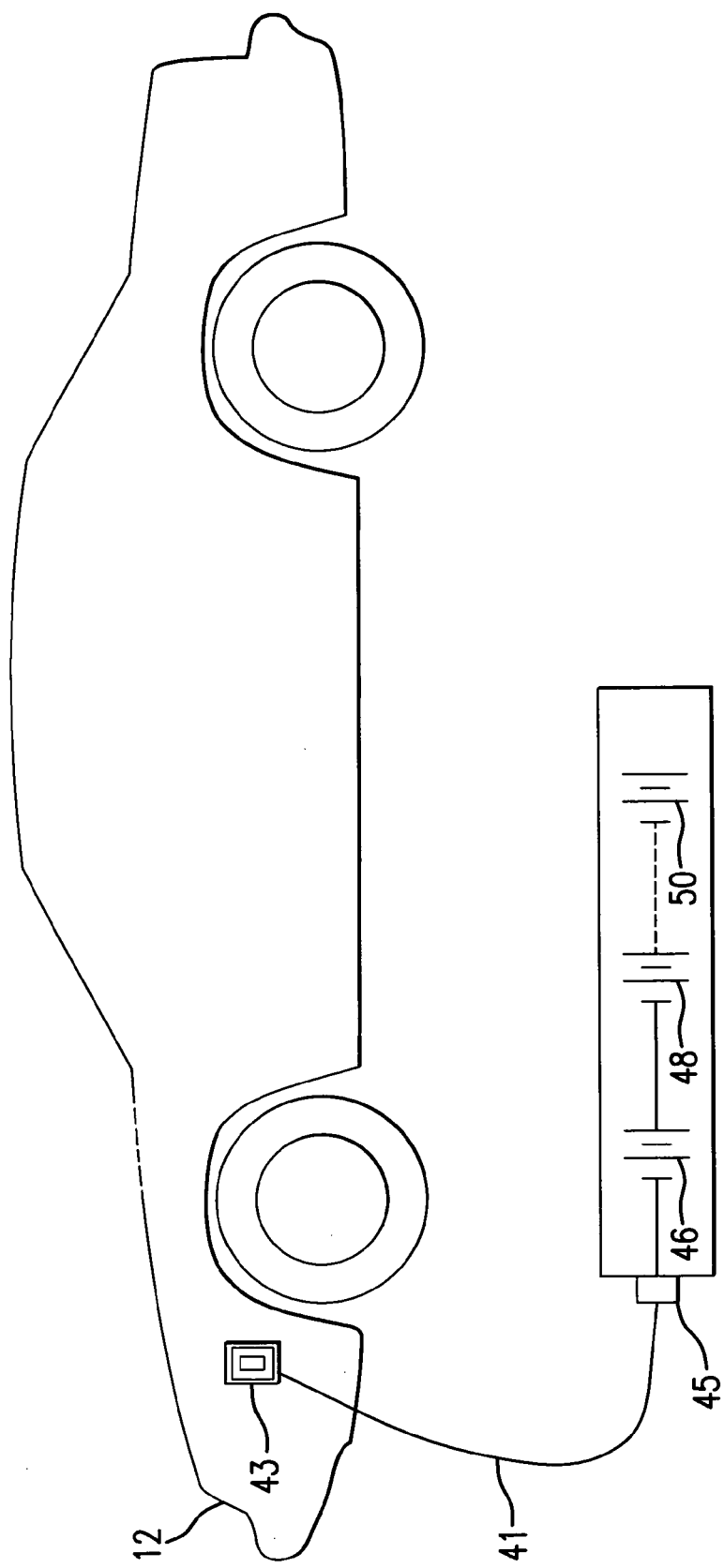
FIG. 3 is a diagram showing the transference of the electricity produced by a vehicle according to the present invention.

FIG. 2 illustrates an electrical diagram of the present invention. Once a switch 38 such as can be attached to the accelerator of the vehicle 12 is depressed, batteries 32 and/or 34 would be used to start the motor 40 of the vehicle. As the vehicle begins to move and the switch 38 is still closed, electricity would be produced by either an alternator or the generator 20. The voltage and current produced by the generator 20 would be controlled by a voltage regulator 36 provided between the generator 20 and the one or more batteries 32, 34. As the vehicle moves, electricity would constantly be transmitted from the generator 20 to the batteries 32 and 34. A gauge 33 associated with the batteries would be included in the cab of the vehicle 12 indicating the amount of electricity currently stored in the batteries 32 and 34. Once the amount of electricity reaches a particular level as monitored by the gauge 33, the vehicle can then proceed to a collection or transfer facility as illustrated with respect to FIG. 3. When the capacity of the batteries are reached, a sensor associated with the gauge 33 would disconnect the batteries from the voltage generator 36 to ensure that the batteries are not overcharged. The vehicle 12 would be provided with an outlet 43 onto which a cable 41 provided at the facility would be used to transfer the stored electricity through a plug 45 to a series of storage batteries 46, 48 and 50. Since one of the batteries 32 or 34 shown in FIGS. 1 and 2 must be used in the ignition system of a vehicle, it is important that not all of the electricity stored in the batteries 32 and 34 be transferred to the storage batteries 46, 48 and 50. Consequently, a switch 42, as shown in FIG. 2, is provided to insure that this situation does not occur. Therefore, once the vehicle arrives at the transfer facility and prior to the cable 41 being connected to the vehicle, switch 42 will be opened, thereby insuring that the electricity stored in one of the batteries would not be transferred to the storage batteries 46, 48 and 50.

Figure 4:
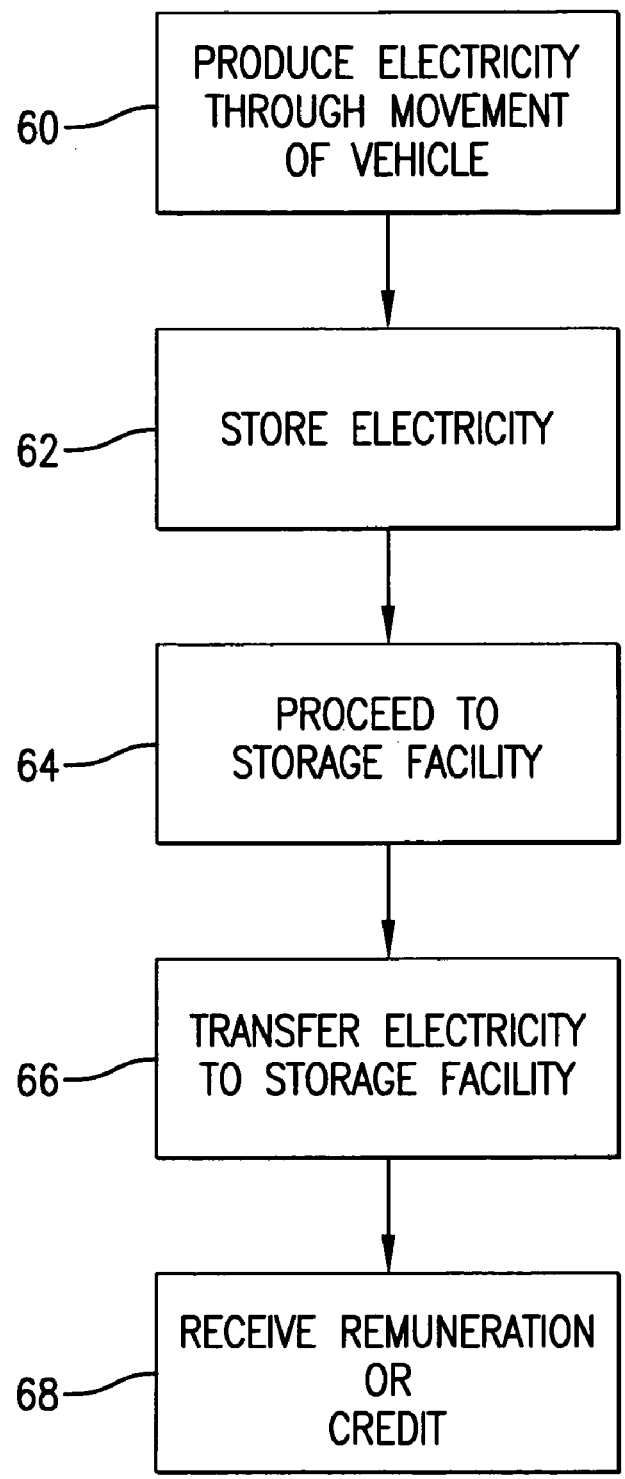
FIG. 4 is a flow diagram showing the method of the present invention.

FIG. 4 illustrates the system according to the present invention. As previously outlined, air introduced to the vehicle as it is moving as step 60 would produce electricity through the use of a generator or alternator. This electricity would then be transmitted from the generator or alternator to one or more storage batteries provided in the vehicle at step 62. Once the vehicle has stored a certain amount of electricity, it would proceed, at step 64, to a facility for the purpose of transferring the energy stored in the vehicle's batteries to an energy storage device, such as large scale commercial batteries or the like at the facility. At this point, as shown by step 66, the electricity is then transferred from the vehicle's batteries to the storage facility. When the electricity is being transferred, the internal gauge 33 would display the dispensing of the electricity. An external gauge at the transfer facility would display the amount of electricity would also display the amount of electricity transferred to the facility. The owner or operator of the vehicle then would receive remuneration or credit based upon the amount of electricity transferred at step 68. This remuneration can be in the form of cash or any type of credit. For example, if the transfer facility is provided at a gasoline station, the amount of energy transferred to the transfer station could be used by the vehicle's owner to purchase gasoline. Additionally, a receipt would be generated including various information relating to the amount of electricity transferred, the date and time of the transfer, the location of the facility, a motor vehicle VIN or the like. Alternatively, if the transfer station is a utility, such as an electrical utility, the vehicle's owner would get a rebate on the cost of electricity supplied from the utility to a residence owned or rented by the vehicle's owner.

For ease of tracking the information relating to the energy transferred from the motor vehicle to the storage facility, an RFID tag 27 to identify the vehicle when it arrives at the transfer facility is either directly attached to the vehicle or is in possession of the owner. Additionally, a security token 29, such as a hardwired token, an authentication token, a cryptographic token which would contain different digital signatures, biometrics or additional material identifying the owner or the vehicle would be provided. A type of security token is an RSA token which will provide two factor authentication providing strong identification as well as validation insuring the authorized owner was in fact downloading the power.

Additionally, the information relating to the amount of power which is downloaded as well as credited to the individual can be provided on a web-based real time management system which would have the capability of tracking all the transactions of downloaded power per vehicle and location etc. This web-based system would track the distribution and sales, remittance and reporting of the power from the vehicle to the downloading station as well as to the power company.

Although a particular embodiment of the invention has been described in detail for purposes of illustration, various modifications may be made without departing from the spirit and scope of the invention. For example, although the present invention has been described with respect to a motor vehicle, it is contemplated that any moving vehicle, such as a boat, ship or railroad train, in which moving air is created by the movement of the vehicle would also fall under the teachings of the present invention. Additionally, power could be produced and stored by many additional mechanisms. For example, excess power from the motor vehicle's alternator or excess power generated by any mechanical means, such as braking could be utilized.

What is claimed is:

1. A system for generating electricity using a moving vehicle and transferring the produced electricity to a collection facility comprising:

a generator provided in the moving vehicle, said generator producing electrical energy while the vehicle is moving by converting mechanical energy produced while the vehicle is moving to electrical energy;

at least one first electrical storage device provided in the moving vehicle and connected to said generator for storing the electrical energy produced by said generator; and a collective facility for transferring at least a portion of the electrical energy stored in said at least one first electrical storage device to a second electrical storage device provided in said storage facility, while the moving vehicle is stopped and is connected to said storage facility.

2. The system in accordance with claim 1, wherein said generator is provided with a plurality of vanes and the moving vehicle includes a device for directly moving air against said plurality of vanes to convert the mechanical movement of said vanes to electrical energy.

3. The system in accordance with claim 2, further including a gauge provided in the moving vehicle for indicating the amount of electrical energy provided in said at least one first electrical storage device.

4. The system in accordance with claim 3, further including a voltage regulator provided between said generator and said at least one first electrical storage device.

5. The system in accordance with claim 4, further provided with a sensor for disconnecting said voltage regulator from said at least one first electrical storage device when the voltage in said at least one first electrical storage device reaches a predetermined level.

6. The system in accordance with claim 4, wherein a plurality of first electrical storage devices are provided in the moving vehicle, and further provided with a switch in the moving vehicle which prevents the energy stored in one of said first electrical storage devices from being transferred to said second electrical storage device.

7. The system in accordance with claim 5, wherein a plurality of first electrical storage devices are provided in the moving vehicle, and further provided with a switch in the moving vehicle which prevents the energy stored in one of said first electrical storage devices from being transferred to said second electrical storage device.

8. A system for generating electricity using a moving vehicle and utilizing the produced electricity to power one or more stand alone devices, comprising:
a generator provided in the moving vehicle, said generator producing electrical energy while the vehicle is moving by converting mechanical energy provided while the vehicle is moving to electrical energy;
at least one first electrical storage device provided in the moving vehicle and connected to said generator for storing the electrical energy produced by said generator;
wherein when the moving vehicle is stopped and is connected to one or more of the stand-alone devices the electricity produced by the moving vehicle and stored in said at least one first electrical storage device is used to operate the stand-alone devices.

9. The system in accordance with claim 8, wherein said generator is provided with a plurality of vanes and the moving vehicle includes a device for directly moving air against said plurality of vanes to convert the mechanical movement of said vanes to electrical energy.

10. The system in accordance with claim 9, further including a gauge provided in the moving vehicle for indicating the amount of electrical energy provided in said at least one first electrical storage device.

11. The system in accordance with claim 10, further including a voltage regulator provided between said generator and said at least one first electrical storage device.

12. The system in accordance with claim 11, further provided with a sensor for disconnecting said voltage regulator from said at least one first electrical storage device when the voltage in said at least one first electrical storage device reaches a predetermined level.

13. The system in accordance with claim 11, further provided with a sensor for disconnecting said voltage regulator from said at least one first electrical storage device when the voltage in said at least one first electrical storage device reaches a predetermined level.

14. The system in accordance with claim 12, wherein a plurality of first electrical storage devices are provided in the moving vehicle, and further provided with a switch in the moving vehicle which prevents the energy stored in one of said first electrical storage devices from being transferred to said one or more stand-alone devices.

15. A method of generating electricity from a moving vehicle, including the steps of:
providing a generator in a moving vehicle to produce electrical energy by converting mechanical energy produced when the vehicle is moving to electrical energy;
transferring and storing the produced electrical energy from said generator to at least one first electrical storage device provided in the moving vehicle; and
transferring at least a portion of said stored electrical energy stored in said at least one first electrical storage device provided in the moving vehicle to a second electrical storage device provided in a storage facility.

16. The method in accordance with claim 15, including the step of converting mechanical energy to electrical energy by providing said generator with a plurality of vanes which rotate by directing air toward said vanes.

17. The method in accordance with claim 15, wherein an individual is provided with remuneration for the amount of electrical energy transferred to said storage facility.

18. The method in accordance with claim 15, wherein an individual is provided with credit related to the amount of electrical energy transferred to said storage facility.

19. A method of generating electricity from a moving vehicle, including the steps of:
providing a generator in a moving vehicle to produce electrical energy by converting mechanical energy produced when the vehicle is moving to electrical energy;
transferring and storing the produced electrical energy from said generator to at least one first electrical storage device provided in the moving vehicle; and
utilizing at least a portion of said stored electrical energy stored in said at least one first electrical storage device to operate one or more stand-alone devices.

20. The method in accordance with claim 19, including the step of converting mechanical energy to electrical energy by providing said generator with a plurality of vanes which rotate by directing air toward said vanes.

21. The method in accordance with claim 15, further including the step of providing a web-based real time management system for tracking the amount of energy transformed to said storage facility.

22. The method in accordance with claim 21, further including the step of attaching an RFID sensor to the moving vehicle, said sensor including information relating to the moving vehicle.

23. The method in accordance with claim 22, further including the step of attaching a security token to the moving vehicle to provide identification validation.

* * * * *